(No Model.)

F. H. KRAMER.
STUD.

No. 548,643.              Patented Oct. 29, 1895.

Witnesses.
E. B. Gilchrist

Inventor:
Frank H. Kramer
By M. D. Leggett & Co
his attorneys.

UNITED STATES PATENT OFFICE.

FRANK H. KRAMER, OF CLEVELAND, OHIO.

STUD.

SPECIFICATION forming part of Letters Patent No. 548,643, dated October 29, 1895.

Application filed July 5, 1895. Serial No. 554,954. (No model.)

*To all whom it may concern:*

Be it known that I, FRANK H. KRAMER, of Cleveland, in the county of Cuyahoga and State of Ohio, have invented certain new and useful Improvements in Studs; and I do hereby declare the following to be a full, clear, and exact description of the invention, such as will enable others skilled in the art to which it pertains to make and use the same.

My invention relates to improvements in coil or spiral bearing-studs, buttons, &c., the object being to provide a stud, button, &c., of the variety indicated, with simple and inexpensive means for positively preventing the self-withdrawal of the device from the shirt-bosom or object to which it is attached.

With this object in view my invention consists in certain features of construction and combinations of parts, hereinafter described, and pointed out in the claims.

Figure 1:
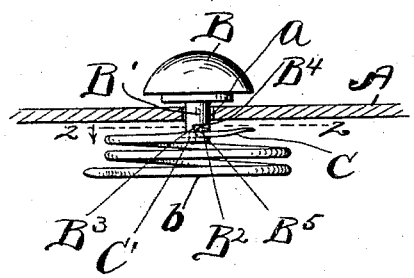
Figure 2:
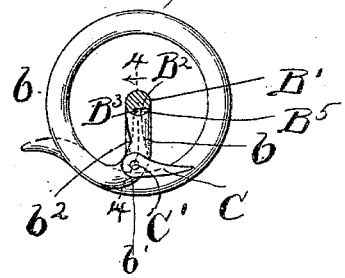
Figure 3:
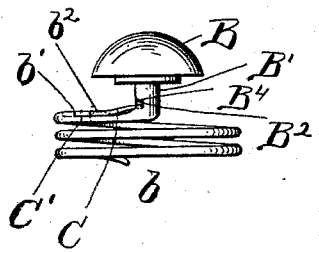
Figure 4:
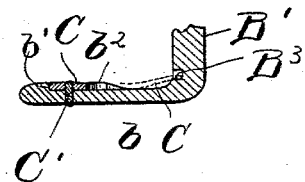

In the accompanying drawings, Figure 1 exhibits a side elevation of a stud or button embodying my invention. Fig. 2 is a section on line 2 2, Fig. 1, looking in the direction of the arrow. Fig. 3 is a right-hand side elevation relative to Fig. 2, except that in Fig. 3 the dog or keeper employed for preventing the self-withdrawal of the button or stud is shown in its inoperative position, whereas in Figs. 1 and 2 said dog or keeper is shown in its operative position. Fig. 4 is a section on line 4 4, Fig. 2, looking in the direction of the arrow.

In Fig. 1 the stud or button is shown attached to the shirt-bosom or object A that is provided with a lateral hole $a$ for the insertion of the coiled member or spiral of the device.

Referring to the drawings, B designates the head of the stud or button, and B' the stem or shank of the same, which shank or stem at its inner end is provided with a coiled member or spiral $b$. A dog or keeper C is shown pivoted at one end, as at C', to the forward side of member $b$ a short distance from the shank or stem B' of the device. Keeper C, in its inoperative position, extends longitudinally of the forward side of the inner end of the spiral or coiled member $b$, as shown in solid lines, Fig. 3, and in dotted lines Figs. 2 and 4, and at its inner extremity or free end engages the enlargement $B^3$ of the inner end of a recess $B^2$, formed in the stem or shank $a$. Recess $B^2$ is preferably provided with a flaring mouth $B^4$ for facilitating the reception of the keeper when the latter is actuated from an operative position (shown in solid lines, Figs. 1 and 2) into its inoperative position. Keeper C in its operative position projects laterally from the shank or stem engaging portion of the spiral or coiled member, as shown in Figs. 1 and 2, and prevents self-withdrawal of the device from the shirt-bosom or object to which the device is attached.

Member $b$, at the pivoted end of the keeper, is provided with a shoulder $b'$ that faces in the direction of shank or stem B', or approximately in that direction, and is preferably arranged with its forward extremity flush with the forward side of the keeper. Member $b$, at any suitable point between the pivotal bearing of keeper C and shank or stem B', is preferably provided with a shoulder or forwardly-projecting member $b^2$, adapted to be engaged by the keeper in the inoperative position of the latter and constitute a stop to limit the movement of the keeper from an operative to an inoperative position, which stop prevents any mutilation of the free extremity of the keeper from any tendency to actuate the keeper beyond its inoperative position in moving it from an operative to an inoperative position.

The enlargement $B^3$ of the inner end of recess $B^2$ in stem or shank B' forms a shoulder $B^5$, that constitutes a stop for preventing the self-withdrawal of the keeper from the inner enlarged end of the aforesaid recess, and I would here remark that the arrangement of parts is preferably such that said shoulder shall be arranged in the path taken by the free extremity of the keeper outside of shank or stem B', and the keeper has sufficient elasticity or springiness to render it capable of bending laterally as required to enable it to readily pass through the flaring mouth or recess $B^2$ against the action of its elastic property, and the free end of the keeper, upon arriving in the enlarged inner end of said recess in the actuation of the keeper from an operative to an inoperative position regains its normal position and enters the enlargement of said end of the recess.

Of course if stem or shank B' has a recess $B^2$ and said recess is enlarged at its inner end, as at B³, as in the case illustrated, the free end of the keeper must be bent laterally to disengage it from said enlargement of the recess preparatory to the actuation of the keeper from its inoperative into an operative position.

What I claim is—

1. The combination with the head and stem or shank of a device of the character indicated, which shank or stem, at its rear end, is provided with a spiral or coiled member, of a dog or keeper suitably supported from the device at a suitable point and adapted to prevent self-unscrewing of the spiral or coiled member of the device from the object to which the device is attached.

2. The combination with the head and stem or shank of a device of the character indicated, which shank or stem, at its rear end, terminates in a spiral or coiled member, of a dog or keeper pivoted at one end and adapted to prevent self-unscrewing of the device from the object to which the device is attached.

3. The combination with the head and stem or shank of a device of the character indicated, which stem or shank terminates in a spiral or coiled member, of a dog or keeper pivotally supported from the device at the shank or stem-engaging portion of the spiral or coiled member, said keeper, in its normal or inoperative position extending longitudinally of the stem or shank-engaging portion of the spiral or coiled member and being adapted to be actuated upon its pivotal bearing into a position wherein it projects laterally of said portion of the spiral or coiled member, substantially as shown, for the purpose specified.

4. The combination with the head and stem or shank of a device of the character indicated, which stem or shank, at its rear end, is provided with a spiral or coiled member, of a dog or keeper pivotally supported from the device at the shank or stem-engaging portion of the spiral or coiled member, and a stop for limiting the movement of the keeper from an inoperative to an operative position, substantially as shown, for the purpose specified.

5. The combination with the head and stem or shank of a device of the character indicated, which stem or shank, at its rear end, is provided with a spiral or coiled member, of a dog or keeper pivotally supported from the device at the shank or stem-engaging portion of the spiral or coiled member, and a stop for limiting the movement of the keeper from an inoperative to an operative position and consisting of a shoulder formed upon the spiral or coiled member and having its outer extremity arranged flush with the outer side of the keeper, substantially as shown, for the purpose specified.

6. The combination with the head and stem or shank of a device of the character indicated, which stem or shank, at its rear end, is provided with a spiral or coiled member, of a pivotally supported dog or keeper for preventing self-withdrawal of the device from the object to which the device is attached, and a stop for limiting the movement of the keeper from an operative to an inoperative position, substantially as shown, for the purpose specified.

7. The combination with the head and stem or shank of a device of the character indicated, which shank or stem is provided with a spiral or coiled member at its rear end, and is also provided with a recess, of a dog or keeper pivoted at one end to the spiral or coiled member a suitable distance from the aforesaid shank or stem, and having sufficient length to reach into the aforesaid recess, substantially as shown, for the purpose specified.

8. The combination with the head B and stem or shank B' of a device of the character indicated, which shank or stem, is provided with a spiral or coiled member at its rear end, and is also provided with a recess B² having a flaring mouth B⁴ and enlarged, at its inner end, as at B³, of the dog or keeper C pivoted at one end to the forward side of the spiral or coiled member a suitable distance from the aforesaid shank or stem, and having sufficient length to render it capable of reaching into the aforesaid recess, all arranged and operating substantially as shown, for the purpose specified.

In testimony whereof I sign this specification, in the presence of two witnesses, this 29th day of June, 1895.

FRANK H. KRAMER.

Witnesses:
C. H. DORER,
L. WARD HOOVER.